United States Patent [19]

McNair

[11] Patent Number: 4,642,424

[45] Date of Patent: Feb. 10, 1987

[54] CRYPTOGRAPHIC TRANSMISSION SYSTEM

[75] Inventor: Bruce E. McNair, Holmdel, N.J.

[73] Assignee: AT&T Information Systems Inc., Holmdel, N.J.

[21] Appl. No.: 567,815

[22] Filed: Jan. 3, 1984

[51] Int. Cl.[4] .............................................. H04L 9/00
[52] U.S. Cl. ........................................ 380/48; 380/49
[58] Field of Search ............... 178/22.14, 22.16, 22.17, 178/22.09; 375/109, 110

[56] References Cited

U.S. PATENT DOCUMENTS

| | | | |
|---|---|---|---|
| 3,349,175 | 10/1967 | Meisingset et al. | 178/22.17 |
| 4,079,188 | 3/1978 | Kinch, Jr. et al. | 178/22.17 |
| 4,091,423 | 5/1978 | Branscome | 178/22.17 |
| 4,109,856 | 8/1978 | van Beverer et al. | 178/22.17 |
| 4,166,922 | 9/1979 | Kinch, Jr. et al. | 178/22.17 |
| 4,169,212 | 9/1979 | Kinch, Jr. et al. | 178/22.16 |
| 4,172,963 | 10/1979 | Belcher et al. | 178/22.17 |
| 4,208,544 | 6/1980 | Burke, Jr. | 178/22.17 |
| 4,211,891 | 7/1980 | Glitz | 178/22.17 |
| 4,305,152 | 12/1981 | Asakawa et al. | 178/22.17 |
| 4,313,031 | 1/1982 | Widmer | 178/22.17 |
| 4,434,322 | 2/1984 | Ferrell | 178/22.17 |
| 4,434,323 | 2/1984 | Levine et al. | 178/22.17 |

Primary Examiner—Salvatore Cangialosi
Assistant Examiner—Aaron J. Lewis
Attorney, Agent, or Firm—Ronald D. Slusky

[57] ABSTRACT

In a cryptographic communication system, a first encryptor transmits to a first decryptor and a second encryptor, co-located with the first decryptor, transmits to a second decryptor, which is co-located with the first encryptor. Each encryptor/decryptor pair is adapted to communicate using a selected non-self-synchronizing cryptographic mode. Whenever it is determined that synchronization between, say, the first encryptor and the first decryptor has been lost, both the first decryptor and the co-located, second encryptor are switched from the non-self-synchronizing mode to the self-synchronizing mode. This causes a loss of synchronization between the second encryptor and second decryptor since the latter is still operating in the non-self-synchronizing mode. Upon detection of this loss of synchronization, the second decryptor and the co-located, first encryptor are also switched from the non-self-synchronizing mode to the self-synchronizing mode. In due course, then, synchronization in both transmission directions automatically restores.

Return of each encryptor/decryptor pair to operation using the non-self-synchronizing mode is thereafter initiated by having each encryptor transmit a string of "1"s followed by a "0". The encryptor thereupon returns to the non-self-synchronizing mode. The string of "1"s is long enough to ensure that synchronization with the encryptor is re-established and when the "1"-to-"0" transition is detected at the decryptor, it, too, is switched back to the non-self-synchronizing mode.

37 Claims, 3 Drawing Figures

CRYPTOGRAPHIC TRANSMISSION SYSTEM

BACKGROUND OF THE INVENTION

The present invention relates to the transmission of digital information and has particular application to cryptographic transmission systems.

Techniques for cryptographic transmission of digital information can be categorized as being either cryptographically self-synchronizing or non-self-synchronizing. Self-synchronizing techniques, such as the cipher text auto key (CTAK) mode of the well-known Data Encryption Standard (DES), have the advantage that the crypto-state vector generators in the encryptor and decryptor will synchronize, i.e., automatically come to store the same crypto-state vector value, without having to be initialized to the same value. Disadvantageously, however, self-synchronizing techniques extend transmission errors, meaning that a single transmission channel error will give rise to an entire burst of errors at the receiver. In high error rate environments, this can render use of encryption impractical.

By contrast, the non-self-synchronizing techniques such as key auto key (KAK) or the state-sequence-driven mode of the DES, do not extend errors. They do, however, require that a synchronization signal be transmitted when the encryptor and decryptor are to be initially synchronized, and, thereafter, whenever they become unsynchronized. This is undesirable from both the cryptanalytic and transmission efficiency points of view.

SUMAMRY OF THE INVENTION

The present invention provides a way of taking advantage of the desirable aspects of both the self-synchronizing and non-self-synchronizing approaches.

In particular, in a cryptographic transmission system embodying the principles of the invention, an encryptor and decryptor are adapted to communicate using a non-self-synchronizing cryptographic mode. However, whenever the decryptor's cryptographic synchronization with the encryptor has been lost—as would be manifested, for example, by the bit error rate at the decryptor output becoming very large—action is initiated at the decryptor to cause both the decryptor and the encryptor to switch to a self-synchronizing mode. Once synchronization has been re-established, the encryptor and decryptor are returned to the original, non-self-synchronizing mode.

In preferred embodiments, the invention is implemented in a two-way transmission system in which a first encryptor transmits to a first decryptor and a second encryptor, co-located with the first decryptor, transmits to a second decryptor, which is co-located with the first encryptor. In accordance with a feature of the invention, which is applicable not only to cryptographic transmission systems, but also to other types of two-way transmission systems, there is provided an advantageous way for it to be communicated from, say, the local end of the channel to the remote end thereof that there are abnormalities in the received data signal and/or the recovered data stream as, for example, would result in a cryotographic transmission system, from a loss of cryptographic synchronization. In particular, whenever such abnormalities are detected at the local end, abnormalities are caused to occur in the signal being transmitted in the opposite direction, i.e., from the local end to the remote end. Such abnormalities might be, for example, violations of a source coding format, irregularities in the channel coding format, etc. The occurrence of these abnormalities, when detected at the remote end, is interpreted thereat to mean that, indeed, there is a problem at the local end. Appropriate corrective action can then be taken.

Thus, in a cryptographic transmission system embodying the principles of the invention and, in particular, embodying the feature thereof just described, whenever it is determined at, for example, the first decryptor in response to the detection of format violations in the decrypted data that synchronization between the first decryptor and the first encryptor—which have theretofore been operating in a non-self-synchronizing mode—has been lost, both the first decryptor and the co-located, second encryptor are switched form the non-self-synchronizing mode to the self-synchronizing mode. This causes a loss of synchronization between the second encryptor and second decryptor since the latter is still operating in the non-self-synchronizing mode and thus gives rise to format violations in the data decrypted by the second decryptor. When these violations are detected, the second decryptor and the co-located, first encryptor are also switched from the non-self-synchronizing mode to the self-synchronizing mode. In due course, then, synchronization in both transmission directions automatically restores.

Also in preferred embodiments, return of the system to the non-self-synchronizing mode is thereafter initiated by having each encryptor transmit a synchronization pattern comprised of first and second portions, the latter being uniquely distinguishable from any portion of the former. Illustratively, the synchronization pattern is comprised of a string of bits having a first clear text value, e.g., "1", followed by at least one bit having the other value, e.g., "0". The encryptor is thereupon returned the non-self-synchronizing mode. The string of bits is long enough to ensure that synchronization with the decryptor is re-established, and when the bit value transition is detected at the decryptor it, too, is switched back to the non-self-synchronizing mode. The re-synchronization is thus complete.

A particular advantage of the above-described preferred implementation is that an interloper cannot tell when transitions from one encryption mode to the other occur, thereby maintaining high resistance to cryptanalysis.

DETAILED DESCRIPTION

Figure 1:
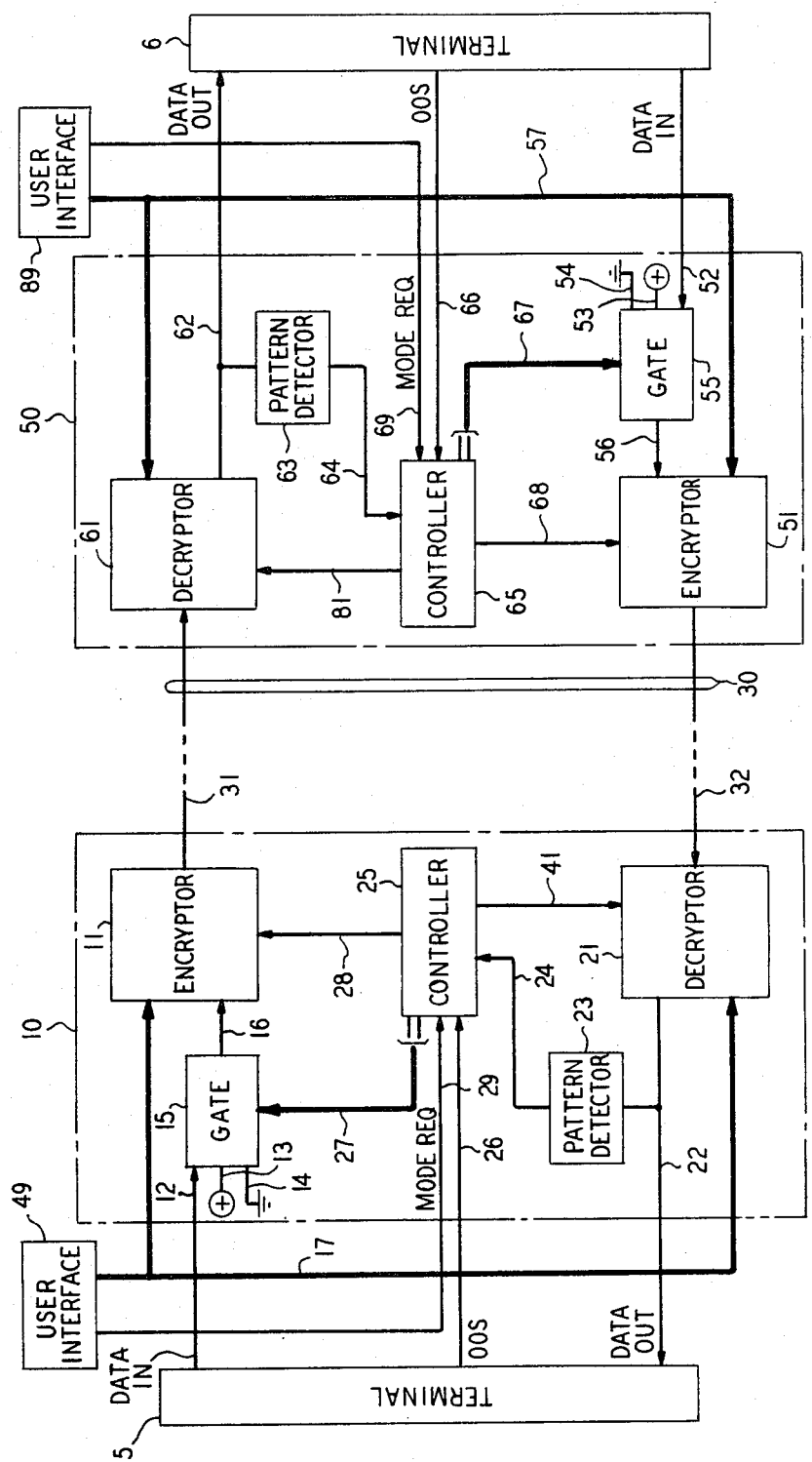
FIG. 1 is a block diagram of an illustrative cryptographic digital communication system embodying the principles of the present invention.

The system of FIG. 1 comprises a pair of substantially identical digital cryptographic transceivers 10 and 50 embodying the principles of the invention. This system operates to securely communicate data, digital information, e.g., between respective associated terminals 5 and 6 (each which may be a CRT terminal, computer, etc.) via a two-way, full-duplex communication channel 30 illustrating a pair of one-way communication lines 31 and 32.

Data desired to be communicated from terminal 5 to terminal 6 is applied by the former to the transmission section of transceiver 10 via data input lead 12. That lead comprises a first input lead for a 3-input gate 15. During normal data communications, which will be assumed to be presently ongoing, a controller 25 within transceiver 10 applies to gate 15 via lead pair 27 a signal indicating that gate 15 is to apply to its output lead 16 the signal on lead 12. From lead 16, the data is applied to an encryptor 11. The latter encrypts the data on lead 16 in response to a 56-bit key variable supplied in parallel from a user interface 49 on cable 17. User interface 49, in turn, (as well as user interface 89 discussed hereinbelow) can receive the key variable from an external source in conventional fashion in accordance with any of the numerous key distribution techniques known in the art. The key variable is illustratively changed once per communication session, or "call".

The mode of encryption used by encryptor 11 is selected to be either the cipher text auto key (CTAK) mode of the Data Encryption Standard (DES), which is a self-synchronizing mode of encryption, or the state-sequence-driven (SSD) mode thereof, which is a non-self-synchronizing mode of encryption, the selection being specified from within transceiver 10 by a controller 25 via a transmit mode lead 28. Encryptor 11 applies the encrypted data to line 31, from which the encrypted data is received, or recovered, by the reception portion of transceiver 50, that portion including a decryptor 61.

Transceiver 50, more particularly, further includes a controller 65. As is described below, controller 65 has information as to whether the received data was CTAK- or SSD-encrypted in transceiver 10 and controller 65 provides that information to decryptor 61 via a receiver mode lead 81. This allows decryptor 61, which receives the same aforementioned encryption key from user interface 89 on cable 57, to appropriately decrypt the received data using a CTAK or SSD decryption mode that corresponds to the CTAK or SSD encryption mode used by encryptor 11. The decrypted data is then provided to terminal 6 on lead 62.

At the same time, data from terminal 6 desired to be communicated to terminal 5 is applied to data input lead 52. During normal data communications, controller 65 applies to gate 55 via lead pair 67 a signal indicating that gate 55 is to apply to its output lead 56 the signal on lead 52. From lead 56, the data is applied to an encryptor 51. The latter encrypts the data in response to the encryption key provided on cable 57 using either CTAK encryption or SSD encryption, as specified by controller 65 via transmit mode lead 68. Encryptor 51 applies the encrypted data to line 32, from which the encrypted data is received within transceiver 10 by decryptor 21. As described below, controller 25 within transceiver 10 has information as to whether the data was CTAK- or SSD-encrypted within transceiver 50 and controller 25 provides that information to decryptor 21 via a receive mode lead 41. This allows decryptor 21, which also receives the encryption key on cable 17, to appropriately decrypt the received data. The decrypted data is then provided to terminal 5 on lead 22.

Also extending to transceivers 10 and 50 from user interfaces 49 and 89 are user mode request leads 29 and 69, respectively. These leads supply to controllers 25 and 65 signals which indicate whether a CTAK or SSD mode of operation—both for encryption and decryption—is desired. Obviously, the signals on these leads must be coordinated, lest the two transceivers be given inconsistent mode requests, i.e., one CTAK and one SSD. Such coordination is the responsibility of the user and, as is well known, may be achieved, for example, via the action of human operators communicating by telephone, who control the mode request signal via a switch (not shown) on their respective user interfaces.

The other elements of the system shown in FIG. 1 will be discussed at appropriate points in the following description of FIG. 2.

Figure 2:
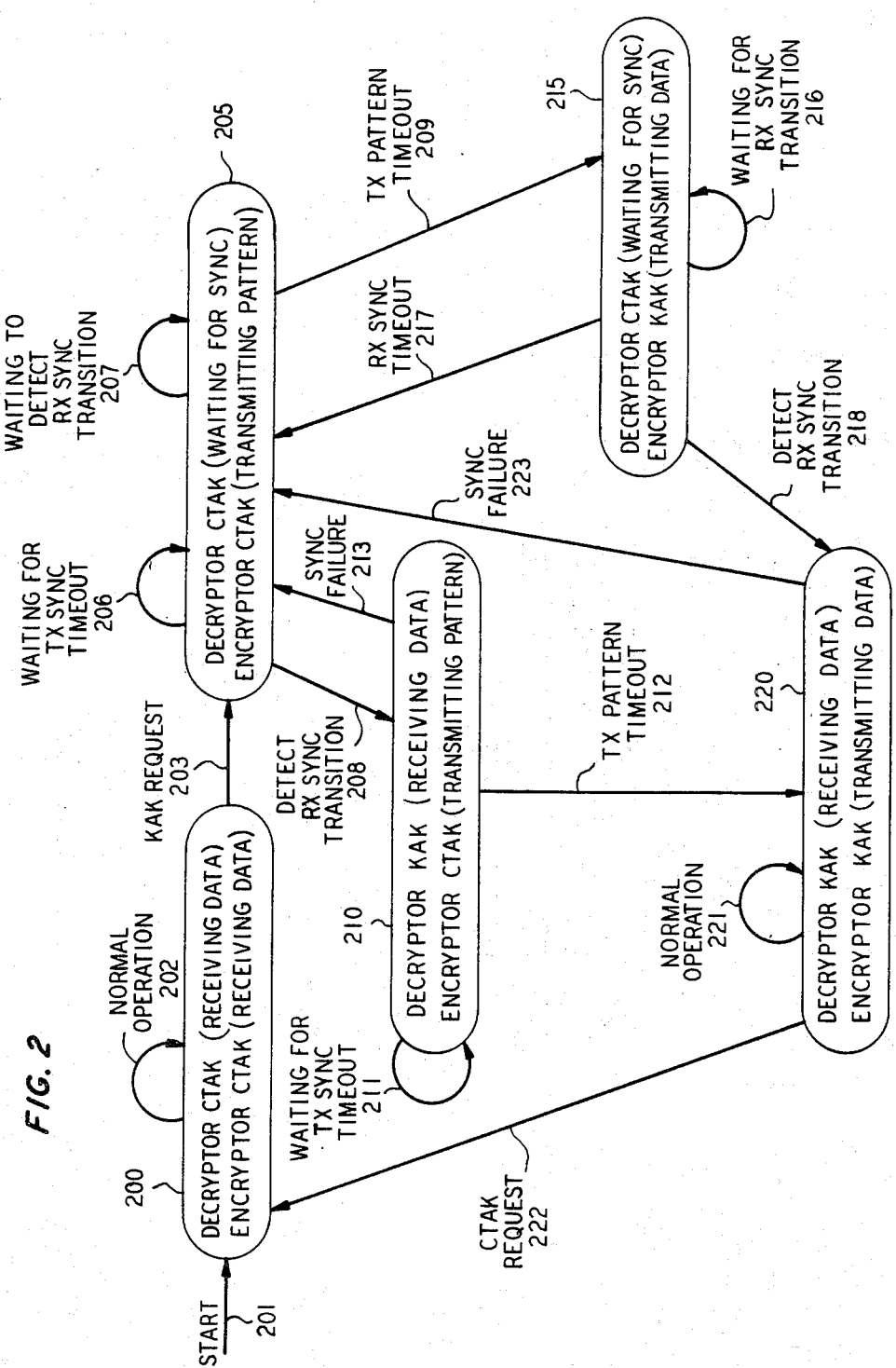
FIG. 2 is a state diagram helpful in explaining the operation of the system of FIG. 1.

Specifically, FIG. 2 depicts the various possible logical states for each transceiver and the various possible paths among those states. Thus, as indicated by path 201, each transceiver, when started up, enters state 200 wherein encryptors 11 and 51 operate in CTAK mode to encrypt the data on leads 12 and 52, and decryptors 21 and 61 operate in CTAK mode to decrypt the encrypted data received from lines 32 and 31, respectively. If the signal on the transceivers' user mode request leads 29 and 69, respectively, indicate that CTAK is the requested operating mode, the transceivers simply remain in normal operation in state 200, as indicated by path 202. Since CTAK is a self-synchronizing cryptographic mode, the system automatically becomes synchronized after a short transmission period, by which is meant that the crypto-state vector generated within each encryptor (as described below) becomes identical to the crypto-state vector generated within the decryptor with which it communicates. (Typically, the data desired to be communicated will be prefixed by a preamble of "don't care" data which is loaded into each encryptor and decryptor for synchronization purposes.) From that point on, the data transmitted by the encryptor in each transceiver will be accurately recovered by the decryptor in the other.

If, however, the signals on leads 29 and 69 indicate that SSD is the requested operating mode, steps must be taken to first obtain cryptographic synchronization between each encryptor and the decryptor with which it commmunicates, since SSD is a non-self-synchronizing mode of encryption. To this end, the transceivers immediately enter state 205 via path 203.

Once, for example, transceiver 10 is in state 205, its controller 25 causes encryptor 11, which is still operating in CTAK mode, to begin to transmit over line 31 a synchronization pattern comprised of two portions, the second being uniquely distinguishable from any part of the first. The synchronization pattern, more particularly, is illustratively comprised of a string of clear text "1"s followed by a single clear text "0", the term "clear text" meaning the value of the bits as they are applied to the encryptor. The number of "1"s in the string is sufficient to ensure that cryptographic synchronization is established between encryptor 11 and decryptor 61, that number being at least 64 in this embodiment. Controller 35 causes the synchronization pattern to be applied to encryptor 11 changing the signal on lead pair 27 so as to first indicate to gate 15 that it should provide on lead 16 the signal on lead 13, which is tied to a constant positive voltage, representing binary "1", and to then indicate to gate 15 that it should provide on lead 16 the signal on lead 14, which is tied to ground, representing binary "0".

Similarly, once transceiver 50 enters state 205, controller 65 thereof causes encryptor 51, which is also still operating in CTAK mode, to begin to transmit the aforementioned synchronization pattern, in CTAK mode, to decryptor 21 of transceiver 10 over line 32. Controller 65 achieves this by providing appropriate signals to gate 55 via lead pair 67, thereby causing gate 55 to provide as its output first the signal on lead 53, on which a constant "1" is carried, and then the signal on lead 54, on which a constant "0" is carried.

At the same time that encryptor 11 begins to transmit the aforementioned synchronization pattern, a pattern detector 23 within transceiver 10 begins to look on lead 22 for a 64-bit run of clear text "1"s followed by a clear text "1"-to "0" transition. Moreover, at the same time that encryptor 51 begins to transmit the synchronization pattern, a pattern detector 63 within transceiver 50 begins to look for the run of clear text "1"s and the "1"-to-"0" transition on lead 62. When pattern detector 23 (63) detects such a transition, it signals controller 25 (65) on lead 24 (64), thereby indicating (assuming no transmission errors or other irregularities) that cryptographic synchronization between encryptor 51 (11) and decryptor 21 (61) has been established.

Paths 206 and 207 in FIG. 2 respectively indicate that each transceiver remains in state 205 as long as (a) the transceiver is waiting for completion of the transmission of the synchronization pattern, which event is referred to in the drawing as "TX sync timeout," and (b) the "1"-to-"0" transition, referred to in the drawing as the "RX sync transition," has not yet been detected.

Looking now specifically, for example, at transceiver 10, assume that RX sync is detected by pattern detector 23 before encryptor 11 has completed transmission of the synchronization pattern. In this case, transceiver 10 enters state 210 via path 208. Decryptor 21 has now been switched from CTAK to SSD operation and is thus able to begin decryptioin of SSD-encrypted data from encryptor 51. At the same time, encryptor 11 continues transmitting the synchronization pattern in the CTAK mode, the latter action being indicated by path 211. When encryptor 11 thereafter completes transmission of the synchronization pattern, transceiver 10 enters state 220 via path 212. Encryptor 11 is thus also switched to the SSD mode and is able to begin to transmit SSD-encrypted data to decryptor 61.

Assume, on the other hand, that, from state 205, transmission of the synchronization pattern by encryptor 11 completes before pattern detector 23 detects the RX sync transition. In this case, transceiver 10 leaves state 205 for state 215 via path 209. Encryptor 11 has now been switched to the SSD operation and can begin to transmit SSD-encrypted data, while pattern detector 23 continues to wait for the RX sync transition, as indicted by path 216. When that transition is ultimately detected, transceiver 10 enters state 220 via path 218 and decryptor 21 is also switched to the SSD mode.

Since transceivers 10 and 50 are substantially identical, the state transition sequence described in the previous paragraph applies with equal validity to the operation of transceiver 50. The ultimate result, then, is that both transceivers are established in state 220, with data being communicated over both lines 31 and 32 in the SSD mode.

A further possibility to be accounted for is that the RX sync transition awaited in state 215 will not have been detected by the pattern detector within a particular transceiver within a predetermined receiver synchronization timeout period. If this is so, it cannot be safely assumed that synchronization has been restored. Accordingly, that transceiver is returned to state 205.

More specifically, assume, for example, that pattern detector 63 within transceiver 50 does not detect RX sync transition within the aforementioned received synchronization timeout period. Accordingly, transceiver 50 returns from state 215 to state 205 via path 217. Encryptor 51 is switched back to CTAK operation and again initiates transmission of the synchronization pattern. Pattern detector 61, meanwhile, continues to wait for the RX sync transition on lead 62.

At this point, transceiver 10 will also return to state 205, no matter what state it was in. This can be understood as follows: If transceiver 10 is in state 215 when transceiver 50 re-enters state 205, this means that the RX sync transition has not yet been detected by pattern detector 23. Accordingly, the re-initiation of the transmission synchronization pattern by encryptor 51 will cause the synchronization timeout period waited for by transceiver 10 on path 216 to elapse before the RX sync transition in the newly-transmitted synchronization pattern will occur. This causes transceiver 10 to return to state 205 via path 217 just as transceiver 50 did.

Assume, on the other hand, that transceiver 10 is in either state 210 or state 220 when transceiver 50 returns from state 215 to state 205. Assume, further, that the data provided by each one of terminals 5 and 6 on leads 12 and 52, respectively, is formatted using a selected format violations of which are detectable within the other terminal. Such a format may be, for example, framed PCM, HDLC, etc. Consider, now, the data stream generated by decryptor 21 on lead 22 in response to the stream of "1"s initiated within transceiver 50. This data stream will not conform to the selected format since it was generated by decryptor 21 in response to a data stream that was not generated within terminal 6. (Indeed, since decryptor 21 is operating in SSD mode while encryptor 51 is operating in CTAK mode, the data stream on lead 22 will not even be a string of "1"s but, rather, some random bit pattern.) With format violations thus being detected within terminal 5, the latter provides an out-of-synchronization (00S) indication to controller 25 on lead 26. Controller 25 responds by returning transceiver 10 to state 205 via path 213, if transceiver 10 was in state 210, thereby switching decryptor 21 from SSD operation back to CTAK operation, or via path 223 if transceiver 10 was in state 220, thereby switching both encryptor 11 and decryptor 21 from SSD to CTAK operation. With both transceivers thus in state 205, system operation proceeds as already described.

A similar sequence of events would obtain if it were pattern detector 23, rather than pattern detector 63, that did not detect the transition awaited in state 215 within the receiver synchronization timeout period. Accordingly, this eventuality need not be discussed in further detail except to point out the existence of an out-of-synchronization lead 66 extending to controller 65 from terminal 6.

Once both transceivers are concurrently in state 220, they remain in that state—encrypting and decrypting data in SSD mode operation, as indicated by path 221—until one of two things happens. One possibility is that the signals on user mode request leads 29 and 69 may change, indicating that the user desires a CTAK mode of operation. In this case, each transceiver simply returns to state 200, via path 222.

The other possibility is that cryptographic synchronization between one or both encryptor/decryptor pairs is lost. Assume, by way of example, that the loss of synchronization is between encryptor 51 and decryptor 21. In accordance with a feature of the invention, this fact is made known at encryptor 51 as follows: The fact that cryptographic synchronization between encryptor 51 and decryptor 21 has been lost means that there will be a very high bit error rate and accompanying format violations in the data provided on lead 22. Terminal 5 then generates an out-of-synchronization indication to controller 25 on lead 26. This causes transceiver 10 to return to state 205 via path 223, thereby switching both encryptor 11 and decryptor 21 from SSD to CTAK operation. The thus-initiated transmission of CTAK-encrypted "1"s over path 31 by encryptor 11 causes a very high bit error rate in the data provided on lead 62 because transceiver 50 is still in state 220 and thus decryptor 61 is operating in SSD mode. Upon detecting this very high bit error rate, terminal 6 generates an out-of-synchronization indication to controller 65 on lead 66. This causes transceiver 50 to also leave state 220 and enter state 205 via path 223, thereby switching both encryptor 51 and decryptor 61 from SSD to CTAK operation. From this point, system operation proceeds as already described, resulting, ultimately, in a return by both transceivers to state 220, with both encryptors and both decryptors being switched back to SSD operation.

One further point to be addressed in conjunction with FIG. 2 relates to the fact that if transceivers 10 and 50 have been in state 200, and thus have been operating in CtAK mode, for any period of time, they are assumed to be cryptographically synchronized. Thus, if it were desired to switch to SSD operation at a subsequent point in time, it would not, in theory, be necessry for each transceiver to proceed to state 205 for the purpose of establishing synchronization. Rather, it might be possible for each transceiver to proceed directly to state 220. As a practical matter, however, it would still be necessary for each decryptor to be able to identify the precise point in the received data stream at which the data becomes SSD-encrypted, as opposed to CTAK-encrypted. That point is, of course, identified by the "1"-to "0" transition in the synchronization pattern. Thus, in this embodiment, even if a transceiver has been operating for a period of time in CTAK mode in state 200, a subsequent request to change to SSD mode causes the transceiver to enter state 205 as shown in the drawing.

Figure 3:
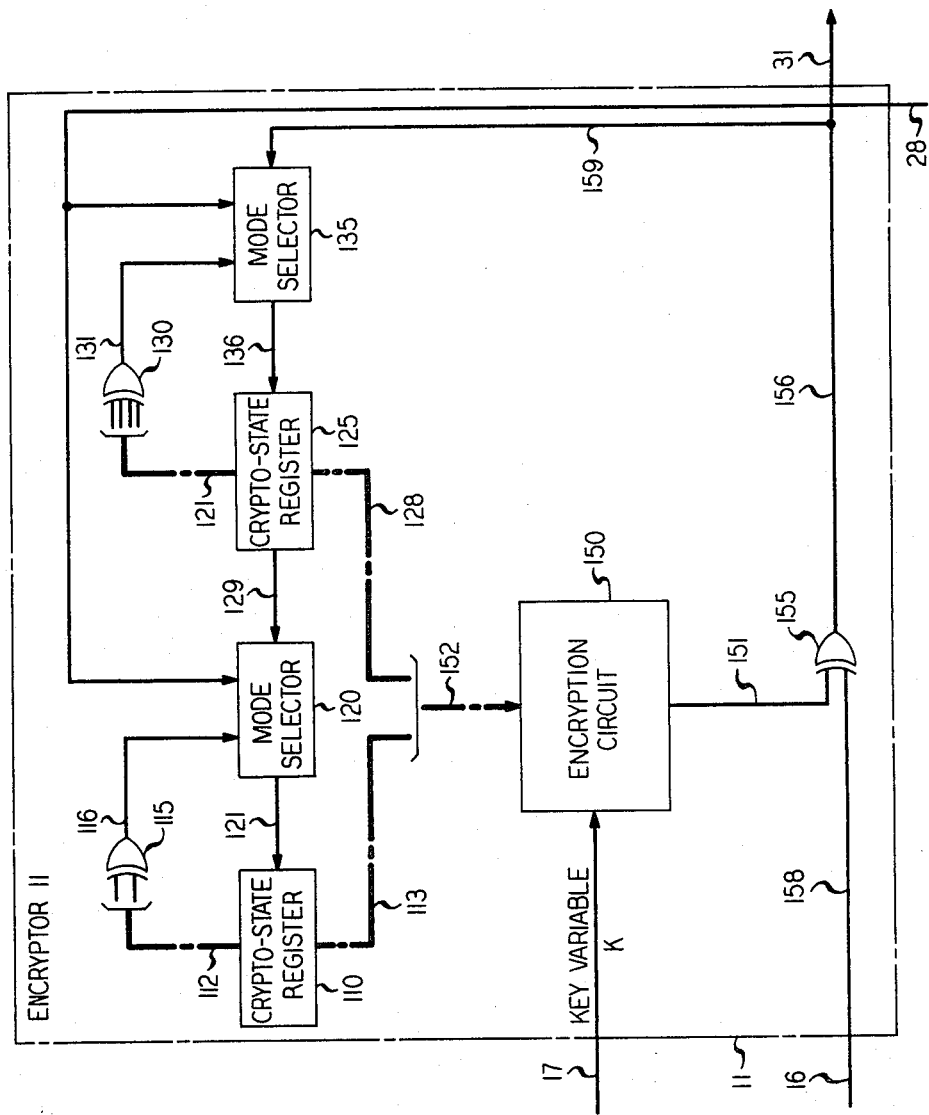
FIG. 3 is a block diagram of an illustrative encryptor used in the system of FIG. 1.

An exemplary embodiment of encryptor 11 is shown in FIG. 3. Encryptor 51 is, illustratively, identical to encryptor 11 and need not be discussed in further detail.

At the heart of encryptor 11 is an encryption circuit 150. This circuit is illustratively a commercially available integrated circuit which implements the Date Encryption Standard (DES). Circuit 150 has two principal inputs. One of these is the aforementioned key variable on cable 17. The value of this key variable defines which of the $2^{56}$ possible instances of the DES encryption algorithm the circuit is to use.

The other input to circuit 150 is the so-called crypto-state vector, which is generated internally within encryptor 11 and provided on cable 152. The crypto-state vector is a binary word having, in this example, 64 bits, whose value changes for each bit of the lead 16 input data. For each value of the crypto-state vector, encrption circuit 150 generates on lead 151 a single encrypted bit in accordance with the selected encryption algorithm. That bit is then applied to one input of an exclusive-OR gate 155. The other input for gate 155 is the current "clear text" data bit on lead 16, which lead is denoted internally within the encryptor as lead 158. The stream of bits at the output of gate 155 comprises the encryptor's "cipher text" output on line 31, which lead is denoted internally within the encryptor as lead 156.

The remainder of the circuitry of encryptor 11 generates the crypto-state vector on cable 152. In particular, that circuitry includes 33-stage crypto-state shift register 110, 32-state crypto-state shift register 125, exclusive-OR gates 115 and mode 130 and selectors 120 and 135. At any given point in time, the crypto-stage vector on cable 152 comprises the 32 bits then stored in register 125, which are provided on cable 128, and the first 32 bits stored in register 110, which are provided on cable 113. When the next crypto-state vector is needed, a new bit is shifted into register 110 from selector 120 output lead 121 and, concurrently, a new bit is shifted into register 125 from selector 135 output lead 136.

The source of the bits that each one of selectors 120 and 135 puts on its respective output lead depends on whether the encryptor is operating in CTAK mode or SSD mode, as specified by the signal on transmit mode lead 28. In particular, when the encryptor is to operate in CTAK mode, the signal on lead 28 causes selector 120 to provide on its output lead 121 the bits on register 125 output lead 129—which derive from the last stage of register 125—and it causes selector 135 to provide on its output lead 136 the bits on cipher text output lead 31, the latter bits being extended to selector 135 via lead 159.

On the other hand, when the encryptor is to operate in SSD mode, the signal on lead 28 causes selector 120 (135) to provide on its output lead the bits on the output lead 116 (131) of exclusive-OR gate 115 (130). Exclusive-OR gate 115, in particular, is a 2-input gate which, illustratively, receives its inputs from the 14th and 33rd stage of register 110 via a cable 112. Exclusive-OR gate 130 is a 4-input gate which, illustratively, receives its inputs from the 10th, 30th, 31st and 32nd stages of register 125 via as cable 121.

Decryptors 21 and 61 are not only substantially identical to one another, but also are very similar in structure to encryptors 11 and 61. In fact, the structure shown in FIG. 3 can be used as a decryptor by applying the received cipher text on lead 158, taking the signal on lead 156 as the decryptor output, and taking the signal for lead 159 from lead 158 rather than from lead 156.

Although not the case in the illustrative embodiment of FIG. 3, the encryptors and decryptors shown in FIG. 1 may include conventional modulation, demodulation and other data transmission circuitry to facilitate transmission and recovery of the encrypted bits.

Controllers 25 and 65 are, illustratively, respective microprocessors programmed in straightforward fashion to perform the functions described herein.

As previously noted, the above-described feature of the invention—wherein the existence of an abnormality in the signal received at (say) a local end of the transmission channel is communicated to the remote end by causing there to be abnormalities in the signal transmitted in the other direction—is applicable not only to cryptographic transmission systems, but also to other types of two-way transmission systems. Thus, for example, consider a system in which two-way communication is carried on between two modems at some first data rate. Assume that, as the result of a subsequent channel degradation, the bit error rate in the data transmitted to the local end becomes abnormally high. Assume further that the appropriate corrective action is for data to be transmitted from the remote end to the local end at a lower bit rate. The fact that such corrective action needs to be taken can be communicated from the local end to the remote end by causing the data that is transmitted to the remote end from the local end to be transmitted using, for example, signal constellation points, many or all of which are intentionally dispersed from the "ideal" points. The abnormally high dispersion in the received signal points serves as notice at the remote end that, in fact, a lower bit rate should be gone too.

It will thus be appreciated that the foregoing merely illustrates the principles of the invention. It is anticipated that those skilled in the art will be able to devise numerous arrangements which, although not explicitly shown or described herein, embody the principles of the invention.

What is claimed is:

1. Apparatus comprising
means for receiving input data,
encryption means operative for encrypting said data utilizing a selected cryptographic non-self-synchronizing encryption mode, and
means for initiating transmission of the resulting encrypted data to a decryption means which utilizes a cryptographic non-self-synchronizing decryption mode that corresponds to said cryptographic non-self-synchronizing encryption mode,
said encryption means being further operative for encrypting said cryptographic data utilizing a selected self-synchronizing encryption mode and aid apparatus further comprising means operative for switching the operation of said cryptographic encryption means to said self-synchronizing encryption mode in response to an indication that said encryption means and said decryption means are not cryptographically synchronized.

2. The invention of claim 1 further comprising means operative upon the switching of the operation of said cryptographic encryption means to said self-synchronizing mode for applying to said data receiving means a data stream having first and second portions, said second portion being uniquely distinguishable from any part of said first portion and said first portion being of sufficient length to ensure that said encryption means and said decryption means become cryptographically synchronized, said switching means being further operative subsequent to the encryption of said second portion for switching the operation of said cryptographic encryption means back to said non-self-synchronizing mode.

3. The invention of claim 2 wherein said first portion is comprised of a stream of bits all having a particular one bit value and wherein said second portion is comprised of at least one bit having a second bit value.

4. A cryptographic transceiver comprising
local encryption means operative for encrypting data applied thereto using a selected cryptographic non-self-synchronizing encryption mode,
transmission means for initiating transmission of the encrypted data to a remote decryption means, and
local decryption means operative for decrypting received data that was encrypted by a remote encryption means using a selected cryptographic non-self-synchronizing encryption mode,
said local encryption means being further operative for encrypting said data using a selected cryptographic self-synchronizing encryption mode, said local decryption means being further operative for decrypting received data that was encrypted by said remote encryption means using a selected cryptographic self-synchronizing encryption mode, and said transceiver further comprising means operative in response to an indication that said remote encryption means and said lcoal decryption means are not cryptographically synchronized for switching the operation of said local encryption means to a cryptographic self-synchronizing encryption mode and for switching the operation of said local decryption means to a cryptographic self-synchronizing decryption mode.

5. The invention of claim 4 further comprising means operative upon the switching of the operation of said cryptographic encryption means to said self-synchronizing encryption mode for applying to said local encryption means a data stream having first and second portions, said second portion being uniquely distinguishable from any part of said first portion and said first portion being of sufficient length to ensure that said local encryption means and said remote decryption means are cryptographically synchronized by the time that said second portion is decrypted by said remote decryption means, said switching means being further operative subsequent to the encryption of said second portion by said local encryption means for switching the operation of said cryptographic local encryption means back to said non-self-synchronizing encryption mode.

6. The invention of claim 5 wherein said first portion is comprised of a stream of bits all having a particular one bit value and wherein said second portion is comprised of at least one bit having a second bit value.

7. Apparatus for use in a cryptographic communication system which includes means for receiving input data, encryption means operative for encrypting said data utilizing alternatively a selected cryptographic non-self-synchronizing encryption mode or a selected cryptographic self-synchronizing encryption mode, and means for applying the resulting encrypted data to a communication channel, said apparatus comprising
means for recovering said encrypted data from said channel,
decryption means operative for decrypting the received encrypted data utilizing alternatively a cryptographic non-self-synchronizing decryption mode corresponding to said selected cryptographic non-self-synchronizing encryption mode or a cryptographic self-synchronizing decryption mode corresponding to said selected cryptographic self-synchronizing encryption mode, and
means for initiating a switch in the operation of said cryptographic encryption means from said non-self-synchronizing mode to said cryptographic self-synchronizing encryption mode and in the operation of said cryptograhic decryption means from said non-self-synchronizing decryption mode to said self-synchronizing decryption mode in response to an indication that said encryption means and said decryption means are not cryptographically synchronized.

8. The invention of claim 7 wherein said system further includes means operative upon said switching of said cryptographic encryption means to said self-synchronizing mode for applying to said data receiving means a data stream having first and second portions, said second portion being uniquely distinguishable from any part of said first portion and said cryptographic first portion being of sufficient length to ensure that said encryption means and said decryption means become cryptographically synchronized, and wherein said initiating means is further operative subsequent to the reception of said second portion by said decryption means for switching the operation of said decryption means back to said non-self-synchronizing decryption mode.

9. The invention of claim 8 wherein said first portion is comprised of a stream of bits all having a particular one bit value and wherein said second portion is comprised of at least one bit having a second bit value.

10. Apparatus for use in a cryptographic communication system, said system including first transmission means for encrypting data applied to its and for transmitting the resulting encrypted data to an associated first reception means, the latter including means for receiving the encrypted data transmitted by said first transmission means and for decrypting that received encrypted data, and second transmission means co-located with said first reception means for encrypting data applied to it and for transmitting the resulting encrypted data to an associated second reception means, the latter being co-located with said first transmission means and including means for receiving the encrypted data transmitted by said second transmission means and means for decrypting that received encrypted data, each of said transmission means being operable in a respective cryptographic non-self-synchronizing encryption mode and in a respective cryptographic self-synchronizing encryption mode and each of said reception means being operable in a cryptographic non-self-synchronizing decryption mode corresponding to the cryptographic non-self-synchronizing encryption mode of the associated transmission means and in a cryptographic self-synchronizing decryption mode corresponding to the cryptographic self-synchronizing encryption mode of the associated transmission means, said apparatus comprising means co-located with each of said reception means for receiving an indication that there is a lack of cryptographic synchronization between that reception mean and the associated transmission means, and means operative when said each reception means and the co-located transmission means are operating in their respective cryptographic non-self-synchronizing modes for switching the operation of that reception means and the co-located transmission means to their respective cryptographic self-synchronizing modes in response to said indication, whereby a loss of cryptographic synchronization between either said first transmission means and said first reception means or between said second transmission means and said second reception means causes both of said transmission means and both of said reception means to switch to their respective cryptographic self-synchronizing modes.

11. The invention of claim 10 wherein said system further includes means operative upon the switching of the operation of each of said transmission means to its cryptographic self-synchronizing mode for applying to said each transmission means a data stream having first and second portions, said second portion being uniquely distinguishable from any part of said first portion and said first portion being of sufficient length to ensure that said each transmission means and the reception means to which it transmits become cryptographically synchronized, and wherein said switching means is further operative subsequent to the decryption of said second portion by an individual one of said reception means for switching the operation thereof back to its cryptographic non-self-synchronizing decryption mode.

12. The invention of claim 11 wherein said first portion is comprised of a stream of bit all having a particular one bit value and wherein said second portion is comprised of at least one bit having a second bit value.

13. A system for communicating data cryptographically comprising means for receiving input data, first means operative for encrypting said data utilizing a selected one of first and second encryption modes and for initiating transmission of the resulting encrypted data over a communication channel, said first and second encryption modes being cryptographic non-self-synchronizing and cryptographic self-synchronizing, respectively, second means for recovering said encrypted data from said channel and operative for decrypting said encrypted data utilizing a selected one of first and second decryption modes corresponding to said first and second encryption modes, respectively, and means operative when said first and second means are respectively operating in said first encryption and decryption modes and in response to an indication that said first and second means are not cryptographically synchronized for switching the operating of said first and second means to said second encryption and decryption modes, respectively.

14. The invention of claim 13 further comprising means operative upon the operation of said switching means to said second encryption mode for applying to said data receiving means a data stream having first and second portions, said second portion being uniquely distinguishable from any part of said first portion and said first portion being of sufficient length to ensure that said first means and said second means become cryptographically synchronized, said switching means being further operative subsequent to the encryption of said second portion by said first means for switching the operation thereof back to said first encryption mode and being further operative subsequent to the decryption of said second portion by said second means for switching the operation thereof back to said first decryption mode.

15. The invention of claim 14 wherein said first portion is comprised of a stream of bits all having a particular one bit value and wherein said second portion is comprised of at least one bit having a second bit value.

16. A cryptographic communication system comprising first and second transmission means for encrypting and then transmitting data respectively applied thereto, first and second reception means for receiving the encrypted data transmitted by said first and second transmission means, respectively, and for decrypting same, said first transmission means being co-located with said second reception means and said second transmission means being co-located with said first reception means, both of said transmission means and both of said reception means being operable in respective cryptographic non-self-synchronizing and cryptographic self-synchronizing modes, means within said first reception means for receiving first signal indicating a lack of cryptographic synchronization between said first transmission means and said first reception means, first switching means operative when said first reception means and said second transmission means are operating in their respective cryptographic non-self-synchronizing modes for switching them to their respective self-synchronizing modes of operation in response to said first signal, means within said second reception means for receiving a second signal indicating a lack of cryptographic synchronization between said second transmission means and said second reception means, and second switching means operative when said second reception means and said first transmission means are operating in their respective cryptographic non-self-synchronizing modes for switching said first reception means and said second transmission means to their respective cryptographic self-synchronizing modes in response to said second signal.

17. The invention of claim 16 further comprising
means operative upon the operation of said first switching means for applying to said first transmission means data stream having first and second portions, said second portion being uniquely distinguishable from any part of said first portion and said first portion being of sufficient length to ensure that said first transmission means and said first reception means are cryptographically synchronized by the time that said second portion is decrypted by said first reception means, said first switching means being further operative subsequent to the encryption of said second portion by said first transmission means for switching the operation of said first transmission means back to said cryptographic non-self-synchronizing mode and being further operative subsequent to the decryption of said second portion by said second reception means for switching the operation of said second reception means back to its cryptographic self-synchronizing mode, and means operative upon the operation of said second switching means for applying to said second transmission means data stream having first and second portions, said second portion being uniquely distinguishable from any part of said first portion and said first portion being of sufficient length to ensure that said second transmission means and said second reception means are cryptographically synchronized by the time that said second portion is decrypted by said second reception means, said first switching means being further operative subsequent to the encryption of said second portion by said second transmission means for switching the operation of said second transmission means back to said cryptographic non-self-synchronizing mode and being further operative subsequent to the decryption of said second portion by said first reception means for switching the operation of said first reception means back to its cryptographic self-synchronizing mode.

18. The invention of claim 17 wherein said first portion is comprised of a stream of bits all having a particular one bit value and wherein said second portion is comprised of at least one bit having a second bit value.

19. A method for use in conjunction with apparatus which comprises
means for receiving input data, encryption means operative for encrypting said data utilizing a selected cryptographic non-self-synchronizing encryption mode, and means for initiating transmission of the resulting encrypted data to a cryptographic decryption means which utilizes a non-self-synchronizing decryption mode that corresponds to said cryptographic non-self-synchronizing encryption mode, said encryption means being further operative for encrypting said data utilizing a selected cryptographic self-synchronizing encryption mode, said method comprising the step of switching the operation of said encryption means to said cryptographic self-synchronizing encryption mode in response to an indication that said encryption means and said decryption means are not cryptographically synchronized.

20. The invention of claim 19 comprising the further steps of
applying to said data receiving means upon the switching of the operation of said encryption means to said cryptographic self-synchronizing mode a data stream having first and second portions, said second portion being uniquely distinguishable from any part of said first portion and said first portion being of sufficient length to ensure that said encryption means and said decryption means become cryptographically synchronized, and switching the operation of said encryption means back to said cryptographic non-self-synchronizing mode subsequent to the encryption of said second portion.

21. The invention of claim 20 wherein said first portion is comprised of a stream of bits all having a particular one bit value and wherein said second portion is comprised of at least one bit having a second bit value.

22. A method for use in a cryptographic transceiver which comprises local encryption means operative for encrypting data applied thereto using a selected cryptographic non-self-synchronizing encryption mode, transmission means for initiating transmission of the encrypted data to a remote decryption means, and local decryption means operative for decrypting received data that was encrypted by a remote encryption means using a selected cryptographic non-self-synchronizing encryption mode, said local encryption means being further operative for encrypting said data using a selected cryptographic self-synchronizing encryption mode, and said local decryption means being further operative for decrypting received data that was encrypted by said remote encryption means using a selected cryptographic self-synchronizing encryption mode, said method comprising the step of
switching the operation of said local encryption means to a cryptographic self-synchronizing encryption mode and the operation of said local decryption means to a cryptographic self-synchronizing decryption mode in response to an indication that said remote encryption means and said local decryption means are not cryptographically synchronized.

23. The invention of claim 22 comprising the further steps of applying to said local encryption means upon the switching of the operation of said local encryption means to said cryptographic self-synchronizing encryption mode a data stream having first and second portions, said second portion being uniquely distinguishable from any part of said first portion and said first portion being of sufficient length to ensure that said local encryption means and said remote decryption means are cryptographically synchronized by the time that said second portion is decrypted by said remote decryption means, and switching the operation of said local encryption means back to said cryptographic non-self-synchronizing encryption mode subsequent to the encryption of said second portion by said local encryption means.

24. The invention of claim 23 wherein said first portion is comprised of a stream of bits all having a particular one bit value and wherein said second portion is comprised of at least one bit having a second bit value.

25. A method for use in a cryptographic communication system which includes means for receiving input data, encryption means operative for encrypting said data utilizing alternatively a selected cryptographic non-self-synchronizing encryption mode or a selected cryptographic self-synchronizing encryption mode, means for applying the resulting encrypted data to a communication channel, means for recovering said encrypted data from said channel, and decryption means operative for decrypting the received encrypted data utilizing alternatively a cryptographic non-self-synchronizing decryption mode corresponding to said selected cryptographic non-self-synchronizing encryption mode or a cryptographic self-synchronizing decryption mode corresponding to said selected cryptographic self-synchronizing encryption mode, said method comprising the step of initiating a switch in the operation of said encryption means from said cryptographic non-self-synchronizing mode to said cryptographic self-synchronizing encryption mode and in the operation of said cryptographic decryption means from said non-self-synchronizing decryption mode to said cryptographic self-synchronizing decryption mode in response to an indication that said encryption means and said decryption means are not cryptographically synchronized.

26. The invention of claim 25 comprising the further steps of applying to said data receiving means upon said switching of said cryptographic encryption means to said self-synchronizing mode a data stream having first and second portions, said second portion being uniquely distinguishable from any part of said first portion and said first portion being of sufficient length to ensure that said encryption means and said decryption means become cryptographically synchronized, and switching the operation of said decryption means back to said cryptographic non-self synchronizing decryption mode subsequent to the reception of said second portion by said decryption means.

27. The invention of claim 26 wherein said first portion is comprised of a stream of bits all having a particular one bit value and wherein said second portion is comprised of at least one bit having a second bit value.

28. A method for use in a cryptographic communication system which includes first transmission means for encrypting data applied to it and for transmitting the resulting encrypted data to an associated first reception means, the latter including means for receiving the encrypted data transmitted by said first transmission means and for decrypting that received encrypted data, and second transmission means co-located with said first reception means for encrypting data applied to it and for transmitting the resulting encrypted data to an associated second reception means, the latter being co-located with said first transmission means and including means for receiving the encrypted data transmitted by said second transmission means and means for decrypting that received encrypted data, each of said transmission means being operable in a respective cryptographic non-self-synchronizing encryption mode and in a respective cryptographic self-synchronizing encryption mode and each of said reception means being operable in a cryptographic non-self-synchronizing decryption mode corresponding to the cryptographic non-self-synchronizing encryption mode of the associated transmission means and in a cryptographic self-synchronizing decryption mode corresponding to the cryptographic self-synchronizing encryption mode of the associated transmission means, and means co-located with each of said reception means for receiving an indication that there is a lack of cryptographic synchronization between that reception mean and the associated transmission means, said method comprising the step of switching the operation of each reception means and the co-located transmission means from their respective cryptographic non-self-synchronizing modes in response to said indication, whereby a loss of cryptographic synchronization between either said first transmission means and said first reception means or between said second transmission means and said second reception means causes both of said transmission means and both of said reception means to switch to their respective self-synchronizing modes.

29. The invention of claim 28 comprising the further steps of applying to each transmission means upon the switching of the operation of said each of said transmission means to its cryptographic self-synchronizing mode a data stream having first and second portions, said second portion being uniquely distinguishable from any part of said first portion and said first portion being of sufficient length to ensure that said each transmission means and the reception means to which it transmits become cryptographically synchronized, and switching the operation of an individual one of said reception means back to its cryptographic non-self-synchronizing mode subsequent to the decryption of said second portion by that reception means.

30. The invention of claim 29 wherein said first portion is comprised of a stream of bit all having a particular one bit value and wherein said second portion is comprised of at least one bit having a second bit value.

31. A method for use in a system for communicating data cryptographically, said system comprising
means for receiving input data, first means operative for encrypting said data utilizing a selected one of first and second encryption modes and for initiating transmission of the resulting encrypted data over a communication channel, said first and second encryption modes being cryptographic non-self-synchronizing and cryptographic-self-synchronizing, respectively, second means for recovering said encrypted data from said channel and operative for decrypting said encrypted data utilizing a selected one of first and second decryption modes corresponding to said first and second encryption modes, respectively, said method comprising the step of switching the operation of said first and second means from said first encryption and decryption modes to said second encryption and decryption modes, respectively, in response to an indication that said first and second means are not cryptographically synchronized.

32. The invention of claim 31 comprising the further steps of applying to said data receiving means upon the operation of said switching means to said second encryption mode a data stream having first and second portions, said second portion being uniquely distinguishable from any part of said first portion and said first portion being of sufficient length to ensure that said first means and said second means become cryptographically synchronized, switching the operation of said first means back to said first encryption mode subsequent to the encryption of said second portion by said first means, and switching the operation of said second means to said first decryption mode subsequent to the decryption of said second portion by said second means.

33. The invention of claim 32 wherein said first portion is comprised of a stream of bits all having a particular one bit value and wherein said second portion is comprised of at least one bit having a second bit value.

34. A transceiver comprising means for applying a two-way transmission channel a signal representing a stream of local data formatted in a violation-detectable format, means for receiving from said channel a signal representing a stream of remote data formatted in a violation-detectable format and for recovering said stream of remote data from said received signal, and means responsive to an indication that violations exist in the format of the recovered stream of remote data for causing format violations to occur in said formatted stream of local data.

35. A method comprising the steps of applying to a two-way transmission channel a signal representing a stream of local data formatted in a violation-detectable format, receiving from said channel a signal representing a stream of remote data formatted in a violation-detectable format and for recovering said stream of remote data from said received signal, and causing format violations to occur in said formatted stream of local data in response to an indication that format violations exist in the recovered stream of remote data.

36. A transceiver comprising means operative in response to a stream of local data for applying to a two-way transmission channel an outgoing signal representing said data, means for receiving from said channel an incoming signal representing a stream of remote data and for recovering said stream of remote data from said incoming signal, and means operative in response to an indication that abnormalities exist in at least one of said incoming signal and the recovered stream of remote data for causing abnormalities to exist in said outgoing signal.

37. A method comprising the steps of applying to a two-way transmission channel an outgoing signal representing a stream of local data, receiving from said channel an incoming signal representing a stream of remote data, recovering said stream of remote data from said incoming signal, and causing abnormalities to exist in said outgoing signal in response to an indication that abnormalities exist in at least one of said incoming signal and the recovered stream of remote data.

* * * * *